[12] United States Patent
Daudish et al.

(10) Patent No.: US 11,717,837 B2
(45) Date of Patent: Aug. 8, 2023

(54) HEATED HOSE NOZZLE (71) Applicant: Rheem Manufacturing Company, Atlanta, GA (US)

(72) Inventors: Kathleen L Daudish, Waterbury, CT (US); Christopher M. Hayden, Waterbury, CT (US); Sergiu G. Mihu, Waterbury, CT (US); Eric R. Jurczyszak, Waterbury, CT (US); Curtis J. Keohane, Waterbury, CT (US)

(73) Assignee: Rheem Manufacturing Company, Atlanta, GA (US)

(*) Notice: Subject to any disclaimer, the term of this patent is extended or adjusted under 35 U.S.C. 154(b) by 0 days.

(21) Appl. No.: 17/588,848

(22) Filed: Jan. 31, 2022

(65) Prior Publication Data

US 2022/0226840 A1 Jul. 21, 2022

Related U.S. Application Data (63) Continuation of application No. 15/968,212, filed on May 1, 2018, now Pat. No. 11,235,341.

(51) Int. Cl.
*B05B 1/24* (2006.01)
*B05B 12/10* (2006.01)
*B05B 12/00* (2018.01)
*F16L 11/00* (2006.01)
*F16L 15/00* (2006.01)

(52) U.S. Cl.
CPC .............. *B05B 1/24* (2013.01); *B05B 12/002* (2013.01); *B05B 12/10* (2013.01); *F16L 11/00* (2013.01); *F16L 15/00* (2013.01)

(58) Field of Classification Search
CPC .... B05B 1/24; B05B 7/02; B05B 7/16; B05B 7/1613; B05B 7/162; B05B 7/164; B05B 7/1646; B05B 7/1693; B05B 7/1673; B05B 7/168; B05B 9/002; B05B 11/0002; B05B 12/002; B05B 12/10; H05B 3/58; F16L 11/00; F16L 15/00
See application file for complete search history.

(56) References Cited

U.S. PATENT DOCUMENTS

| | | | |
|---|---|---|---|
| 2,976,392 A | 3/1961 | Wabnitz | |
| 4,495,481 A * | 1/1985 | Hickling | H01H 37/10 337/349 |
| 5,028,017 A | 7/1991 | Simmons et al. | |
| 6,149,066 A | 11/2000 | Perry | |
| 6,283,656 B1 * | 9/2001 | Jiang | B60S 3/047 15/103 |
| 6,321,037 B1 * | 11/2001 | Reid | A01M 21/04 392/475 |
| 7,190,890 B2 | 3/2007 | Higham et al. | |
| 7,461,416 B2 * | 12/2008 | Stover | E04H 4/129 4/493 |
| 11,235,341 B2 | 2/2022 | Daudish et al. | |
| 2002/0127006 A1 | 9/2002 | Tweedy et al. | |

(Continued)

*Primary Examiner* — Christopher R Dandridge
(74) *Attorney, Agent, or Firm* — Eversheds Sutherland (US) LLP (57) ABSTRACT

A hose nozzle assembly which is capable of heating water comprising an internal heating chamber with at least one heating element. The hose nozzle assembly is able to heat water from a common garden hose with the ability to control both flow rates and temperature.

19 Claims, 5 Drawing Sheets (56) References Cited

U.S. PATENT DOCUMENTS

2006/0260036 A1 11/2006 Stover
2014/0263754 A1* 9/2014 Nushart .................. B08B 3/028
239/442
2015/0289320 A1 10/2015 Long et al.
2015/0298962 A1 10/2015 Shelton et al.

* cited by examiner

HEATED HOSE NOZZLE

CROSS REFERENCE TO RELATED APPLICATIONS

This application is a continuation of U.S. Non-Provisional patent application Ser. No. 15/968,212, filed 1 May 2018, now U.S. Pat. No. 11,235,341, entitled "Heated Hose Nozzle," the entire contents and substance of which is hereby incorporated by reference.

TECHNICAL FIELD

Embodiments described herein relate generally to hose nozzles that are capable of heating water from a hose, and more particularly to a hose nozzle with a bare wire water heater internal to the nozzle.

BACKGROUND

In use, one end of a typical garden hose is connected to an outdoor spigot while the other end is open or connected to a nozzle, such as a sprayer. When a nozzle is used on the end of the garden hose, the water comes under pressure and can be selectively dispensed from the nozzle. The temperature of the water running out of the spigot and thus, the nozzle, tends to be at the temperature of the ground.

However, some applications need heated water. Providing heated water to remote locations inside and outside a home can be challenging. For example, heated water can be used to fill horse troughs, bathe animals, wash cars or boats, fill a pool, and water plants. However, the tanks used to heat and store hot water do not tend to be connected to outdoor spigots.

Thus, what is needed is a way of heating water from a common garden hose using a small profile nozzle with the ability to control both flow rates and temperature.

SUMMARY

The disclosure relates to a water heating hose nozzle assembly. A general embodiment of a hose nozzle assembly comprises an electrical cord; a handle comprising an inlet, a valve, and a valve tubing; a body connected to the handle comprising a heating chamber, wherein the heating chamber comprises a bare wire heating element and wherein the bare wire heating element is configured to be electrically connected to the electrical cord; and a nozzle sprayer connected to the body; wherein a fluid path is formed from the inlet, through the valve, the valve tubing, and the heating chamber, and ends at the nozzle sprayer. In some embodiments, the bare wire heating element comprises more than one bare wire heating element, such as two, three, four, five or six bare wire heating elements. In some specific embodiments, each bare wire heating element has a different watt density. For example, a first heating element of the three bare wire heating elements that is closest in the fluid path to the nozzle sprayer can have a lesser watt density than the other bare wire heating elements of the three bare wire heating element. In some embodiments, the body additionally comprises a control board, an inlet temperature sensor, an outlet temperature sensor, and a flow sensor. The control board can be configured to modulate the power to the bare wire heating element based on inputs from the inlet temperature sensor, the outlet temperature sensor, and the flow sensor. Within the hose nozzle assembly, the handle can additionally comprise a trigger configured to open the valve upon actuation of the trigger. In some embodiments, the trigger is configured to activate the bare wire heating element upon actuation of the trigger. In other embodiments, the bare wire heating element is actuated when the flow sensor senses a continuous fluid flow through the hose nozzle assembly. In specific embodiments, the inlet is a hose with a threaded end configured to be attached to a conventional water spigot or a garden hose. In some embodiments, the nozzle sprayer is configurable to slow a flow of fluid and to provide a plurality of different spray patterns when the fluid exits the nozzle sprayer. The hose nozzle assembly can further comprise a bimetal thermostatic switch which is configured to disable power if a fluid flowing through the hose nozzle assembly is hotter than a predetermined maximum temperature, such as 100, 105, 110, 115, or 120 degrees F.

Another general embodiment of a hose nozzle assembly comprises: an electrical cord; a handle comprising an inlet, a valve and a valve tubing; a body connected to the handle comprising: an inlet temperature sensor; a heating chamber, wherein the heating chamber comprises a heating element; an outlet temperature sensor; a flow sensor; and a control board, wherein the control board is configured to receive inputs from the inlet temperature sensor and the flow sensor; and a nozzle sprayer connected to the body; wherein a fluid path is formed from the inlet, through the valve, the valve tubing, the heating chamber, and the nozzle sprayer; and wherein the control board is configured to regulate an amount of power provided to the heating element given a predetermined temperature set point and the inputs received from the inlet temperature sensor and the flow sensor. The hose nozzle assembly can also comprise a switch configured to control the predetermined temperature set point. In embodiments, the heating element is one or more bare wire heating elements. In some embodiments, the nozzle sprayer is configurable to provide a plurality of different spray patterns when fluid exits the nozzle sprayer. In some embodiments, the control board is configured to modulate the amount of power to the heating element when a change in fluid flow is detected by the flow sensor. The hose nozzle assembly can further comprise a bimetal thermostatic switch which is configured to disable power if a fluid flowing through the hose nozzle assembly is hotter than a predetermined maximum temperature, such as 100, 105, 110, 115, or 120 degrees F. In some embodiments, the heating element is actuated when a steady flow is detected by the flow sensor. In an additional embodiment, the control board is configured to: additionally receive input from the outlet temperature sensor, calculate a power needed by the heating element to adjust an output temperature to equal the predetermined temperature set point; and adjust the amount of power provided to the heating element to equal the calculated power needed.

These and other aspects, objects, features, and embodiments will be apparent from the following description and the appended claims.

BRIEF DESCRIPTION OF THE DRAWINGS

The drawings illustrate only example embodiments of hose nozzle assembly configurations within systems and are therefore not to be considered limiting in scope, as hose nozzle assembly configurations may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to hose nozzle assembly configurations. Example embodiments can be pre-fabricated or specifically generated (e.g., by shaping a malleable body) for a particular environment. Example embodiments can have standard or customized features (e.g., shape, size, features on the inner surface, pattern, configuration). Therefore, the example embodiments described herein should not be considered limited to creation or assembly at any particular location and/or by any particular person. Additionally, a hose nozzle assembly (or components thereof) described herein can be made of one or more of a number of suitable materials.

As used herein, "connected" means two components are indirectly or directly connected to one another. For example, the two components could be connected to each other through the use of a coupling feature or could be directly threaded to each other. In another example, connected could mean connected through one or more wires.

As used herein, "attached" means two components are directly attached to one another, such as through threading one component directly to another.

As used herein, a "coupling feature" can couple, secure, fasten, abut, and/or perform other functions aside from merely coupling. A coupling feature as described herein can allow one or more components of a hose nozzle assembly to become coupled, directly or indirectly, to another portion of the hose nozzle assembly. A coupling feature can include, but is not limited to, a swage, a snap, a clamp, a portion of a hinge, an aperture, a recessed area, a protrusion, a slot, a spring clip, a tab, a detent, a compression fitting, and mating threads.

Any component described in one or more figures herein can apply to any other figures having the same label. In other words, the description for any component of a figure can be considered substantially the same as the corresponding component described with respect to another figure. For any figure shown and described herein, one or more of the components may be omitted, added, repeated, and/or substituted. Accordingly, embodiments shown in a particular figure should not be considered limited to the specific arrangements of components shown in such figure.

Example embodiments of hose nozzle assemblies will be described more fully hereinafter with reference to the accompanying drawings, in which example embodiments of hose nozzle assemblies are shown. Hose nozzle assemblies may, however, be embodied in many different forms and should not be construed as limited to the example embodiments set forth herein. Rather, these example embodiments are provided so that this disclosure will be thorough and complete, and will fully convey the scope of hose nozzle assemblies to those of ordinary skill in the art. Like, but not necessarily the same, elements (also sometimes called components) in the various figures are denoted by like reference numerals for consistency.

Terms such as "first," "second," "top," "bottom," "left," "right," "end," "back," "front," "side", "length," "width," "inner," "outer," "above", "lower", and "upper" are used merely to distinguish one component (or part of a component or state of a component) from another. Such terms are not meant to denote a preference or a particular orientation unless specified, and are not meant to limit embodiments of hose nozzle assemblies. In the following detailed description of the example embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Figure 1:
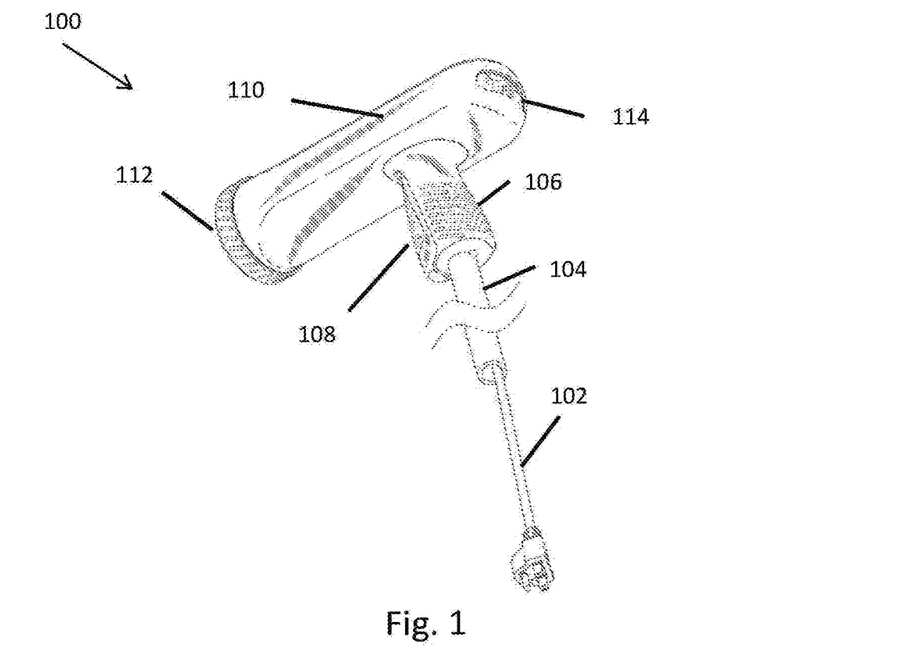
FIG. 1 is a bottom perspective view of a hose nozzle assembly.
Figure 2:
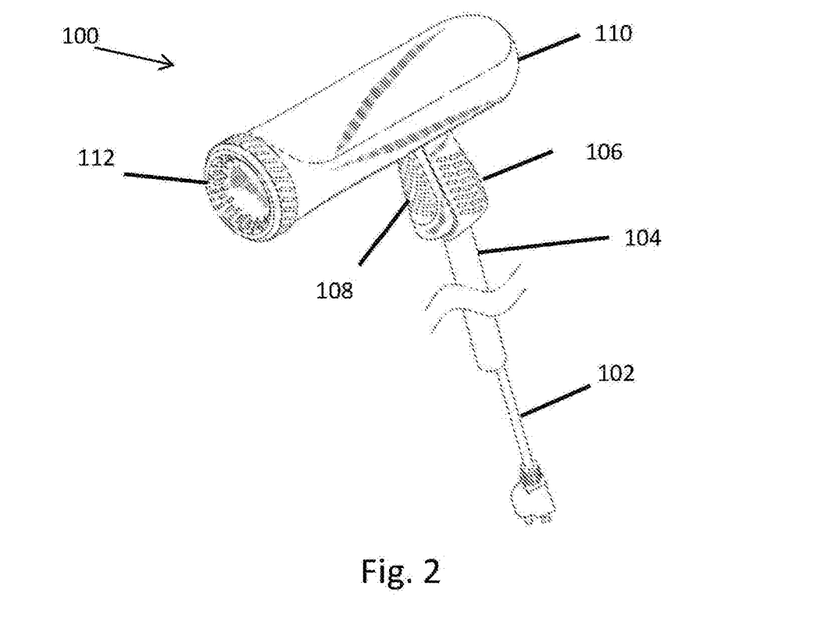
FIG. 2 is a top perspective view of a hose nozzle assembly.

FIG. 1 illustrates a bottom perspective view of an embodiment of the hose nozzle assembly 100. In this embodiment, an electrical cord 102 is shown attached to the inlet 104 and the inlet 104 is connected to the handle 106. In some alternate embodiments, the inlet 104 may be a water hose which is connected to the handle 106. While many of the examples described herein relate to heating water, the hose nozzle assembly can also be used to heat other liquids or mixtures of liquids. The inlet 104 is configured to let water into the hose nozzle assembly 100. The handle 106 may comprise grooves to increase grip. In the embodiment shown, the handle 106 further comprises a trigger 108. Above the handle 106 is the body 110 of the hose nozzle assembly 100 with one end of the body 110 comprising a nozzle sprayer 112. The nozzle sprayer can have a single nozzle or multiple nozzles that can be selected for varying spray patterns. Located on the user side of the body 110 is a switch 114. In certain example embodiments, the switch 114 is used to set the preferred water temperature for water exiting the nozzle sprayer 112. Upon compression of the trigger 108, water flows through the hose nozzle assembly 100, is heated, and flows out of the nozzle sprayer 112. The nozzle sprayer 112 is rotatable such that different configurations of sprays can be selected by a user. FIG. 2 is a top perspective view of an embodiment of a hose nozzle assembly 100 illustrating the elements described in connection with FIG. 1.

In other embodiments, the electrical cord 102 may enter the handle 106 or the body 110 separate from the inlet 104. In some embodiments, the electrical cord 102 is combined with the inlet 104, such as an attached hose. In this embodiment, the electrical cord 102 branches from the attached hose close to the handle 106, or may branch from the attached hose at the other end of the attached hose, or any length in between. In this embodiment, the inlet 104, such as a hose, may be molded together with the electrical cord 102 in a seamless manner. In some embodiments, the electrical cord 102 ends in a wire grounding plug. In some embodiments, the plug comprises a ground fault circuit interrupter or a residual current device. Some embodiments of the disclosure can comprise an on/off switch or depressible power button. The electrical cord 102 can be a standard 120V electrical cord. The inlet 104 may additionally comprise a coupler at the end of the inlet 104 away from the handle 106 of the hose nozzle assembly 100. An inlet coupler may be configured to attached to a common garden hose or spigot.

Figure 3:
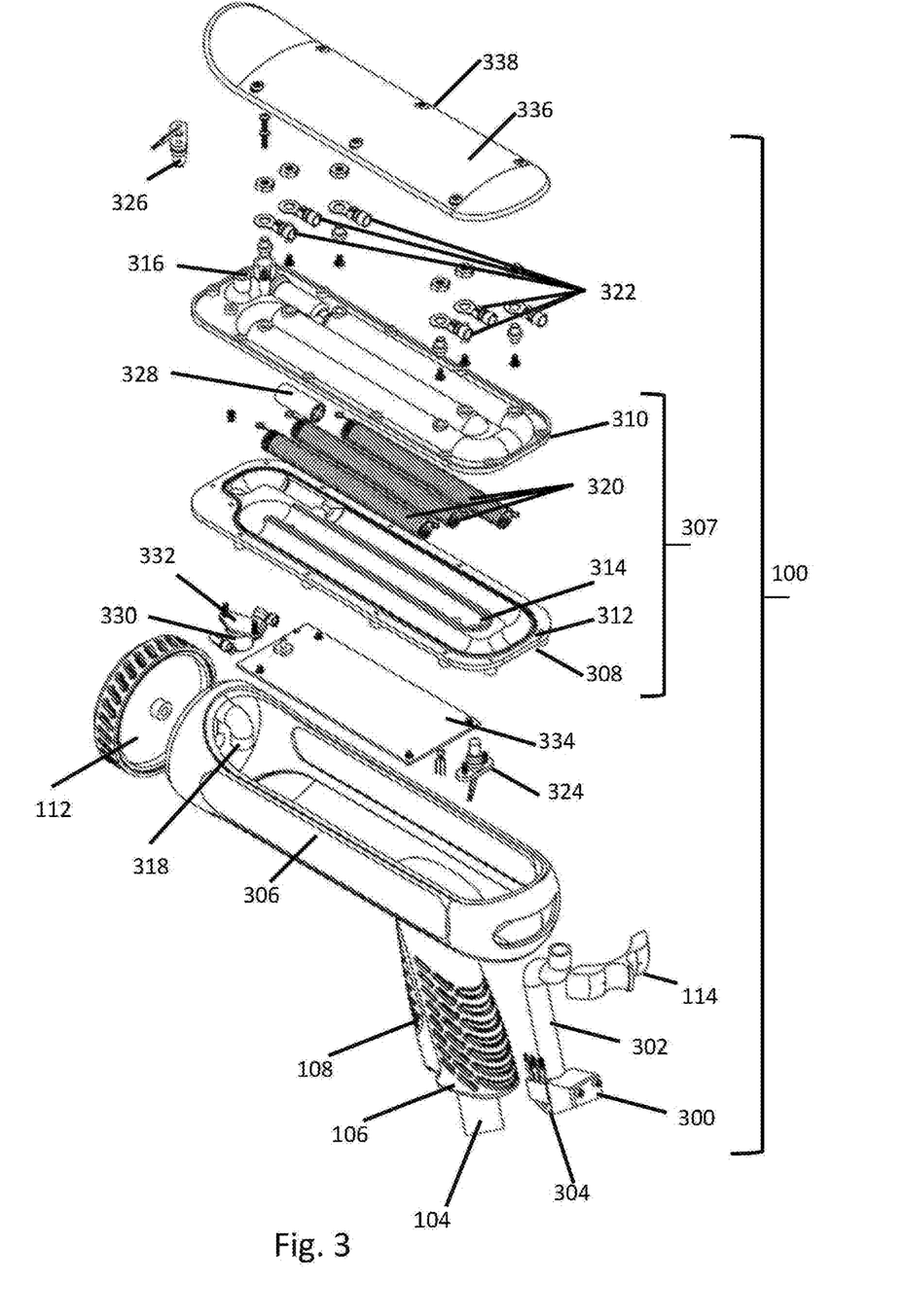
FIG. 3 is an exploded view of a hose nozzle assembly.

FIG. 3 is an exploded view of an embodiment of a hose nozzle assembly 100. Starting from the bottom of FIG. 3, the hose nozzle assembly 100 comprises an inlet 104, handle 106, and trigger 108. Inside of the handle 106 resides a valve 300 configured to cut off the flow of water from the inlet 104. When the valve 300 is actuated by the trigger 108 being depressed, the valve 300 allows water flow from the inlet 104 into the valve tubing 302. A triac 304 is also installed which gates power through the hose nozzle assembly.

The handle 106 is connected to a housing 306 which forms the majority of the body 110 of the hose nozzle assembly 100. A switch 114 fits into the user end of the housing 306 and a nozzle sprayer 112 is located on the opposing end of the housing 306. A heating chamber 307, comprising a bottom section 308 and a top section 310, is located within the housing 306. The bottom section 308 and top section 310 are connected together with a gasket 312 making the heating chamber 307 water tight.

The heating chamber comprises a fluid path and at least one heating element. The fluid path can have a variety of forms. In the example embodiment of FIG. 3, the fluid path is formed in a spiral manner through the heating chamber 307 with a heating chamber inlet 314 connected to the valve tubing 302 and a heating chamber outlet 316 connected to outlet tubing 318. In the example of FIG. 3, the heating element is implemented as three bare wire heating elements 320 that are contained within the heating chamber 307, each within a section of the spiral. Each of the bare wire heating elements 320 are connected to two termination rod wire connections 322, which supply power and ground to the heating elements 320. The termination rod wire connections 322 are connected to termination rods which are in turn connected to the bare wire heating elements 320 through termination screws. The other side of the termination rod wire connections 322 are crimped to wires which receive power from the electrical cord 102.

The outlet tubing 318 is connected to the nozzle sprayer 112, such that water flow can go through the outlet tubing 318 into the nozzle sprayer 112. A water tight fluid path is formed from the inlet 104, through the valve 300, the valve tubing 302, the heating chamber 307, the outlet tubing 318, and ends at the nozzle sprayer 112, releasing a spray of water.

Figure 4:
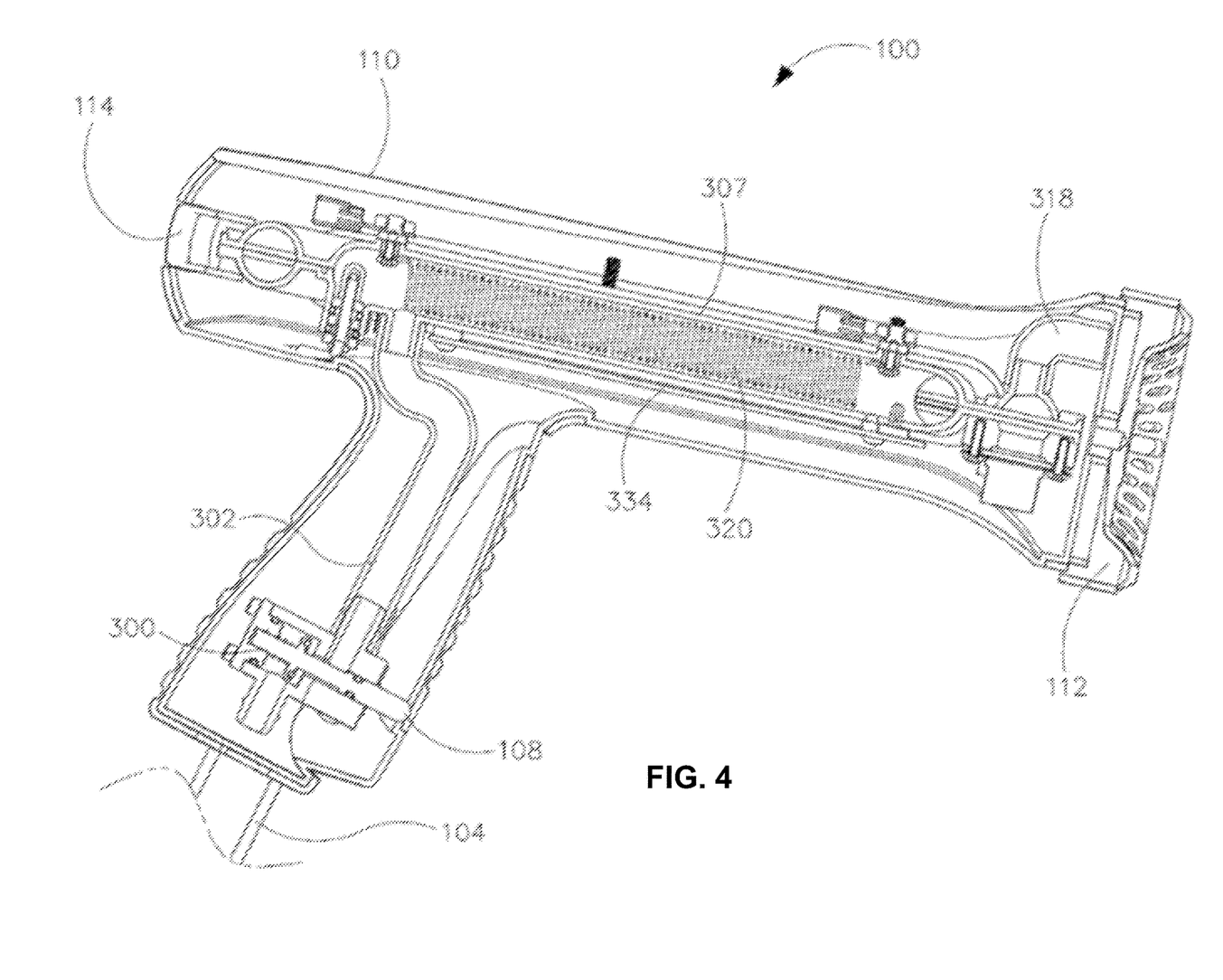
FIG. 4 is a cross section of a hose nozzle assembly.

The hose nozzle assembly 100 also comprises sensors. An inlet temperature sensor 324 is located at the heating chamber inlet 314 and is configured to measure the temperature of water flowing into the heating chamber 307. An outlet temperature sensor 326 is located at the heating chamber outlet 316 and is configured to measure the temperature of water flowing out of the heating chamber 307. A flow meter 328 is located within the heating chamber 307 near the heating chamber outlet 316 and is configured to measure the amount of water flowing out of the heating chamber 307. As an additional safety feature, an ECO switch 330 (electrical cutoff thermostatic switch in series with main power) and an ECO wire connector 332 are included in this embodiment to measure the temperature of the water and to turn off power to the bare wire heating elements 320 if the temperature of the water exceeds 120° F. A control board 334 sits on the bottom of the housing 306. The control board 334 is connected to the inlet temperature sensor 324, outlet temperature sensor 326, flow meter 328, and bare wire heating elements 320. A cover 336 is connected to the housing 306 through the use of screws 338. FIG. 4 illustrates a cross section of an embodiment of the hose nozzle assembly 100 illustrating the elements of FIG. 3 from a different view.

The handle 106, trigger 108, housing 306, switch 114, nozzle sprayer 112, and cover 336 can be made of any of one or more of a number of suitable materials. In some embodiments, these may be formed from plastic, such as ABS, nylon, or fiber reinforced nylon. In certain embodiments, these elements are made of materials that are heat safe to at least 120 degrees F. The handle 106 and trigger 108 are made to be used with one hand during operation of the hose nozzle.

The switch 114 is configured to be adjustable, such that a user can set a preferred temperature for the outlet water. The switch 114 is a multi-position switch such as a rotary potentiometer, potential switch, multi-position switch, rotary encoder, linear encoder, potentiometer or the like.

The inlet temperature sensor 324 and outlet temperature sensor 326 are configured to sense the temperature of the water within a hose nozzle assembly 100. The inlet temperature sensor 324 and outlet temperature sensor 326 may be the same type of temperature sensor, or may be different. The inlet temperature sensor 324 and outlet temperature sensor 326 may be a thermistor or a thermocouple, for example.

The flow meter 328 is able to measure the flow of water through a hose nozzle assembly 100. In some embodiments, the flow meter 328 is a magnetic turbine, paddle wheel, or vortex shedding.

The nozzle sprayer 112 comprises a rotary dial used to select spray patterns. The different spray patterns may also affect flow rates which affect the heating capacity of the heating elements. For example, lower flow rates may result in increased heating of water passing through the heating chamber 307, while higher flow rates may result in a lower temperature rise of water passing through the heating chamber 307. In some embodiments, the nozzle sprayer 112 comprises 6-8 selectable spray patterns.

In example embodiments, the heating chamber 307 is made of a reinforced polymer, such as glass filled polymer. In certain embodiments, the heating chamber 307 is made of materials that are heat safe to at least 120 degrees F. The termination rods may be made from stainless steel, brass, or nickel plated brass, for example.

In certain example embodiments of the disclosure, there are one or more heating elements. For example, there could be 1, 2, 3, 4, 5, 6, or more heating elements located within the heating chamber 307. In example embodiments, the bare wire heating elements 320 (also known as resistant wire heating elements) are made of Nichrome, Nikrothal, or FeCrAl. The bare wire heating elements 320 may be shaped like a spring. In some embodiments, the bare wire heating elements 320 are all shaped like a spring, but may have varying numbers of coils or varying tension in the coils such that the watt density of each bare wire heating element 320 is different. In a specific embodiment, the bare wire heating elements 320 have decreasing watt density closer to the heating chamber outlet 316.

Figure 5:
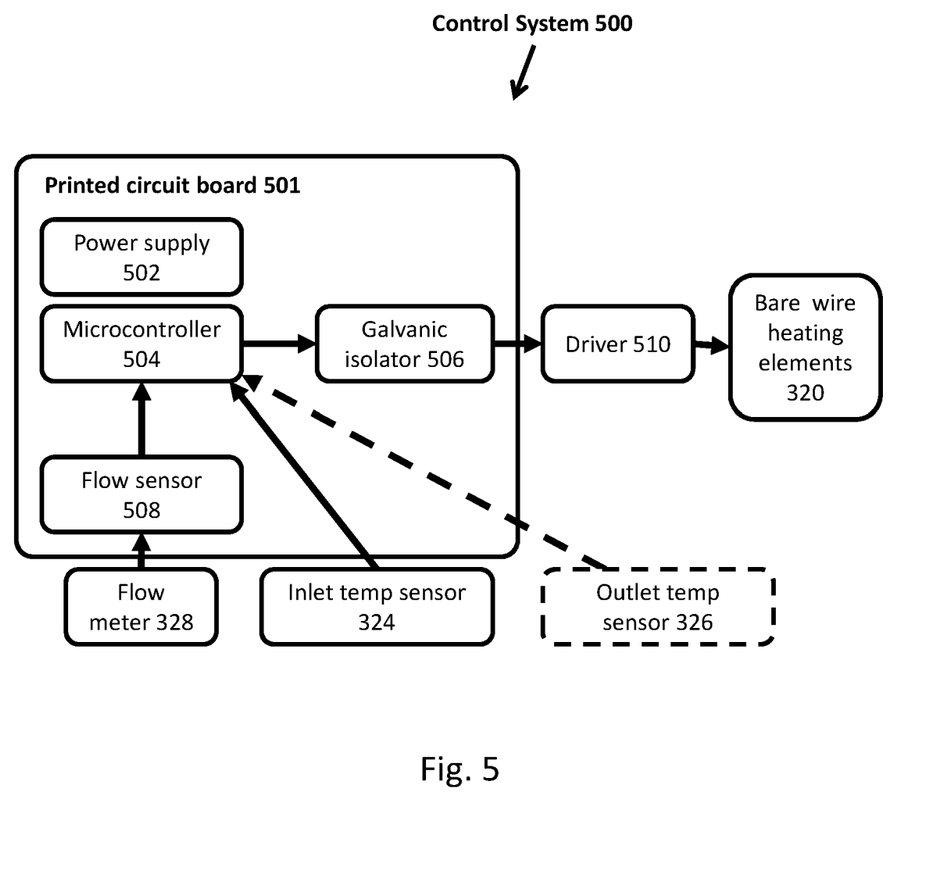
FIG. 5 is a block diagram of a control system for a hose nozzle assembly.

FIG. 5 is a block diagram of an embodiment of the control system 500 for the hose nozzle assembly 100. The control system 500 can be implemented on the example control board 334 shown in FIG. 3. A printed circuit board 501 comprises a power supply 502, which receives power via the electrical cord 102, a microcontroller 504, a galvanic isolator 506, and a flow sensor 508. The flow sensor 508 receives data from the flow meter 328 that is located near the heating chamber outlet 316. The microcontroller 504 can be programmable and can comprise one or more processor cores and memory. The galvanic isolator 506 is used to isolate current flow. The galvanic isolator can be implemented as a transformer or optocoupler, for example.

The microcontroller 504 receives input from the flow sensor 508, the inlet temperature sensor 324, and in some embodiments, the outlet temperature sensor 326. The microcontroller uses one or more of the inputs it receives to control the heating elements. For example, the microcontroller 504 can provide control signals through a galvanic isolator 506 to a driver 510 which provides power to the bare wire heating elements 320. In some embodiments, the galvanic isolator 506 and driver 510 are implemented as a triac 304. The triac 304 receives a control signal (e.g., a 5V signal) from the microcontroller 504, which causes the triac 304 to close to permit power (e.g., 120V) to flow from the electrical cord 102 to the bare wire heating elements 320.

Figure 6:
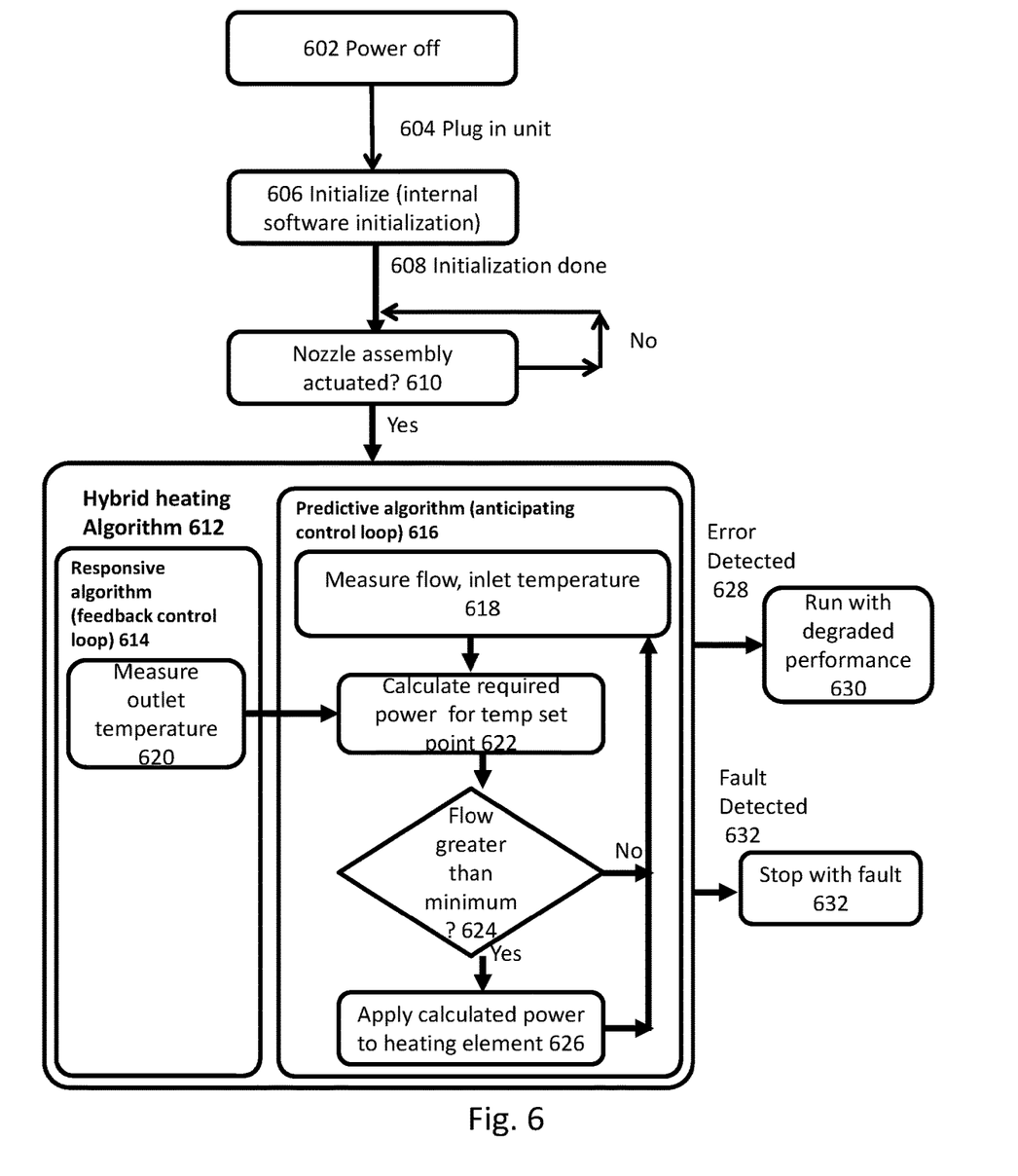
FIG. 6 is a flow chart for a control system for a hose nozzle assembly.

FIG. 6 is a flow chart of an embodiment of the operation of the hose nozzle assembly 100. The hose nozzle assembly 100 initially starts unplugged with the power off (step 602). Once the electrical cord 102 is plugged in (step 604) the microprocessor starts initialization (step 606). Once initialization is complete and the hose nozzle assembly 100 is actuated (step 610), the control system 500 enters into a hybrid heating algorithm 612. The hybrid heating algorithm 612 includes a responsive algorithm 614 and a predictive algorithm 616. The predictive algorithm 616 is an anticipating control loop which takes in the measured water flow from the flow sensor 508 and the inlet temperature from the inlet temperature sensor 324 (in step 618). The responsive algorithm 614, a feedback control loop, measures the outlet temperature from the outlet temperature sensor 326 (in step 620). The power required to heat the outlet water to a predetermined temperature set point (set by switch 114) is calculated given the sensor inputs (in step 622). If the flow, as determined by the flow sensor 508 is greater than a set minimum (in step 624), the microcontroller 504 provides a control signal to apply the power calculated in step 622 to the heating element 626. If the microcontroller 504 detects an error in step 628 at any time, the hose nozzle assembly 100 runs with degraded performance (in step 630). If the microcontroller 504 detects a fault in step 632 at any time, the control system 500 stops all heating with a fault (in step 632). The use of the hybrid heating algorithm 612 allows for adjustments of power to the heating elements to be made on the fly as conditions change.

In some embodiments, the hybrid heating algorithm includes an additional step to check to see if the outlet temperature, measured in step 620, is greater than a predetermined maximum temperature, such as 100° F., 105° F., 110° F., 115° F. 120° F., 125° F., 130° F., or 140° F. If the outlet temperature is greater than the predetermined maximum temperature, the microcontroller 504 turns off power to the heating element until the outlet temperature, measured in step 620, is less than the predetermined maximum temperature. In some embodiments, the minimum flow setting (compared in step 624) can be between 0.1-0.25 gpm for example. In certain embodiments, the microcontroller 504 looks for irregular flow of fluid, and delays activating the heating element if irregular fluid flow is detected.

In some embodiments, a predetermined temperature set point is set from the switch 114. As a non-limiting example, the switch can have 2-6 selectable temperature set points that can range from 50 to 115° F. In other embodiments, the predetermined temperature set point is a constant.

In certain embodiments, the actuation of the nozzle assembly is actuated through depression of the trigger 108. In other embodiments, the actuation of the nozzle assembly could be from an additional depressible button or a power switch. In some embodiments, the actuation of the nozzle assembly could be triggered when the flow sensor 508 senses a steady flow of water or when the flow sensor senses flow above a certain amount, such as 0.1-0.25 gpm. In some embodiments, a secondary on/off switch is included such that the switch must be on and the trigger 108 depressed to actuate the hose nozzle assembly 100 (step 610). In some embodiments, depression of the trigger 108 both opens the valve 300 for the inlet flow of water and also actuates the hybrid heating algorithm 612.

Accordingly, many modifications and other embodiments set forth herein will come to mind to one skilled in the art to which example hose nozzle apparatus pertain having the benefit of the teachings presented in the foregoing descriptions and the associated drawings. Therefore, it is to be understood that example hose nozzle apparatus are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A hose nozzle assembly comprising:
   a handheld enclosure having a handle portion and a body portion, the handle portion connected to the body portion and configured to be gripped by a user;
   a heating chamber housed within the handheld enclosure and comprising an inlet, an outlet, and a heating element configured to heat a fluid;
   a spray nozzle connected to the body portion and configured to direct a flow of fluid from the body portion;
   a valve in fluid communication with the heating chamber and configured to control the flow of fluid through the heating chamber;
   an inlet temperature sensor configured to detect a temperature of the fluid delivered to the heating chamber;
   a flow sensor configured to detect a flow of fluid through the heating chamber; and
   a controller configured to receive inlet temperature data from the inlet temperature sensor and flow data from the flow sensor and control a heat output by the heating element based at least in part on a predetermined temperature set point, the inlet temperature data, and the flow data,
   wherein when the flow of fluid is greater than a predetermined minimum flow, the controller is configured to (i) calculate a power required to heat the fluid exiting the heating chamber to the predetermined temperature set point based on the flow data and the inlet temperature data, and (ii) apply the power to the heating element.

2. The hose nozzle assembly of claim 1 further comprising:
   a rotary dial having a first aperture configured to provide a first flow rate and a second aperture configured to provide a second flow rate, the first flow rate being greater than the second flow rate,
   wherein the rotary dial is configured to rotate between a first position having the first aperture aligned with the spray nozzle and a second position having the second aperture aligned with the spray nozzle.

3. The hose nozzle assembly of claim 2, wherein, when the rotary dial is in the first position, the fluid is heated by the heating element to a first temperature, and wherein, when the rotary dial is in the second position, the fluid is heated by the heating element to a second temperature, the second temperature being greater than the first temperature.

4. The hose nozzle assembly of claim 1, wherein the handheld enclosure is configured for attachment to a hose.

5. The hose nozzle assembly of claim 1 further comprising a valve trigger for controlling the valve.

6. The hose nozzle assembly of claim 5, wherein the valve trigger is configured to activate the heating element upon actuation of the valve trigger.

7. The hose nozzle assembly of claim 1 further comprising an outlet temperature sensor configured to detect a temperature of the fluid exiting the heating chamber.

8. The hose nozzle assembly of claim 7, wherein the controller is further configured to receive outlet temperature data from the outlet temperature sensor and control a heat output by the heating element based at least in part on the predetermined temperature set point, the inlet temperature data, the outlet temperature data, and the flow data.

9. The hose nozzle assembly of claim 1, wherein the heating chamber comprises a longitudinal axis extending therethrough, and
wherein the heating element extends at least partially into the heating chamber such that a length of the heating element is oriented parallel to the longitudinal axis of the heating chamber.

10. The hose nozzle assembly of claim 1, wherein the heating element is a bare wire heating element.

11. The hose nozzle assembly of claim 1 further comprising a bimetal thermostatic switch configured to disable power to the heating element if a temperature of the fluid flowing through the hose nozzle assembly is greater than a maximum temperature.

12. The hose nozzle assembly of claim 11, wherein the maximum temperature is greater than the predetermined temperature set point.

13. A hose nozzle assembly comprising:
a handheld enclosure configured for attachment to a hose and having a body portion and a handle portion, the handle portion being configured to be gripped by a user;
a heating chamber housed within the handheld enclosure and comprising an inlet, an outlet, and a heating element configured to heat a fluid;
a control device configured to disable power to the heating element if a temperature of the fluid is greater than a maximum temperature; and
a spray nozzle connected to the body portion and configured to direct a flow of fluid from the body portion, the spray nozzle having a rotary dial comprising a first aperture configured to provide a first flow rate when the rotary dial is in a first position and a second aperture configured to provide a second flow rate when the rotary dial is in a second position, the first flow rate being greater than the second flow rate,
wherein, when the rotary dial is in the first position, the fluid is heated by the heating element to a first temperature, and
wherein, when the rotary dial is in the second position, the fluid is heated by the heating element to a second temperature, the second temperature being greater than the first temperature.

14. The hose nozzle assembly of claim 13, wherein the control device is a bimetal thermostatic switch or a controller including a processor and memory.

15. The hose nozzle assembly of claim 13 further comprising:
a valve in fluid communication with the heating chamber and configured to control the flow of fluid through the heating chamber; and
a valve trigger for controlling the valve.

16. The hose nozzle assembly of claim 15, wherein the valve trigger is configured to activate the heating element upon actuation of the valve trigger.

17. The hose nozzle assembly of claim 13 further comprising:
an inlet temperature sensor configured to detect a temperature of the fluid delivered to the heating chamber;
a flow sensor configured to detect a flow of fluid through the heating chamber; and
a controller configured to receive inlet temperature data from the inlet temperature sensor and flow data from the flow sensor and control a heat output by the heating element based at least in part on a predetermined temperature set point, the inlet temperature data, and the flow data.

18. The hose nozzle assembly of claim 17, wherein the controller is further configured to modulate power to the heating element based at least in part on the predetermined temperature set point and the inlet temperature data.

19. The hose nozzle assembly of claim 17 further comprising an outlet temperature sensor configured to detect a temperature of the fluid exiting the heating chamber,
wherein the controller is further configured to receive outlet temperature data from the outlet temperature sensor and control a heat output by the heating element based at least in part on the predetermined temperature set point, the inlet temperature data, the outlet temperature data, and the flow data.

* * * * *